United States Patent [19]
Shimozaki et al.

[11] Patent Number: 5,605,298
[45] Date of Patent: Feb. 25, 1997

[54] FISHING SPINNING REEL

[75] Inventors: Tetsuya Shimozaki, Irvine, Calif.; Hiroshi Yoshimura, Saitama, Japan

[73] Assignee: Daiwa Seiko, Inc., Tokyo, Japan

[21] Appl. No.: 359,329

[22] Filed: Dec. 20, 1994

[30] Foreign Application Priority Data

Dec. 22, 1993 [JP] Japan .................. 5-324698

[51] Int. Cl.⁶ .................................................. A01K 89/01
[52] U.S. Cl. ........................................................ 242/231
[58] Field of Search ................................. 242/311, 319, 242/230, 231, 232, 233

[56] References Cited

U.S. PATENT DOCUMENTS

| | | | |
|---|---|---|---|
| 4,108,392 | 8/1978 | Masclet | 242/311 |
| 4,775,112 | 10/1988 | Urso | 242/232 |
| 5,312,067 | 5/1994 | Sugawara et al. | 242/232 |

FOREIGN PATENT DOCUMENTS 5-29029  7/1993  Japan.

*Primary Examiner*—Katherine Matecki
*Attorney, Agent, or Firm*—Longacre & White

[57] ABSTRACT

In a fishing spinning reel in which a bail is coupled through bail supporting members to the ends of a pair of bail supporting arms which are provided on both sides of a rotor, respectively, in such a manner that the bail is swung to be set at a fishing line winding position and a fishing line releasing position; a protective member for protecting the outer periphery of the spool is provided between the pair of bail supporting arms on the side of the fishing line releasing position. The protective member can reinforce the bail supporting arms to improve the operation of winding or letting out the fishing line. The spool is protected by the protective member, for instance when the spinning reel is dropped.

9 Claims, 7 Drawing Sheets

FISHING SPINNING REEL

BACKGROUND OF THE INVENTION

This invention relates to a fishing spinning reel.

A typical fishing spinning reel is constructed as shown in FIG. 13. That is, the fishing spinning reel, as shown in FIG. 13, comprises: a rotor 1; a pair of bail supporting arms 3 provided respectively on both sides of the rotor 1; and a half-ring-shaped bail 5 coupled to the ends of the pair of bail supporting arms 3 through bail supporting members, namely, a bail arm 9 having a line roller 7 and a bail holder (not shown) in such a manner that the bail 5 may be swung to be set at a fishing line winding position A and a fishing line releasing position B.

When, with the bail 5 set at the fishing line winding position as shown in FIG. 13, the rotor 1 is turned to take up the fishing line by turning a manually-operated handle 13 mounted on the reel body 11, the fishing line is wound on a spool 15 which is moved back and forth making traverse motion as the rotor 1 turns.

In FIG. 13, reference numeral 17 designates a mounting leg integral with a reel body 11.

The above-described fishing spinning reel involves problems to be solved. For instance in the case when the fishing rod is carelessly dropped while the fishing line is being wound, the outer periphery of the spool 15 which is on the side of the fishing line winding position A is not damaged because the spinning reel is connected through the mounting leg 17 to the fishing rod; however, the outer periphery of the spool 15 which is on the side of the fishing line releasing position B may be damaged being brought into contact with, for instance, the ground because nothing is provided for protection of the spool 15 on the side of the fishing line releasing position B. If the outer periphery of the spool 15 is damaged, then the fishing line may be damaged thereby. If the spool 15 is deformed, then the rotor 1 may abut against the spool 15.

On the other hand, when the fishing line is wound in response to a bite, a great load is applied to the fishing line. In this case, the above-described spinning reel suffers from the following difficulties: When the fishing line is wound in this manner, the bail supporting arms 3 may be bent inwardly to abut against the spool. In addition, when the fishing line is pulled out in the drag operation, the bail supporting arms 3 may be deformed, thus causing the fishing line to pulsate. That is, it is impossible to smoothly let out the fishing.

SUMMARY OF THE INVENTION

In view of the foregoing, an object of the invention is to provide a fishing spinning reel in which the bail supporting arm is reinforced to improve the operation of winding or letting out the fishing line, and the spool is protected for instance when the spinning reel is dropped.

The foregoing object of the invention has been achieved by the provision of a fishing spinning reel in which a bail is coupled through bail supporting members to the ends of a pair of bail supporting arms which are provided on both sides of a rotor, respectively, in such a manner that the bail is swung to be set at a fishing line winding position and a fishing line releasing position; in which, according to the invention, a protective member for protecting the outer periphery of the spool is provided between the pair of bail supporting arms on the side of the fishing line releasing position.

With the fishing spinning reel of the invention, the protective member protects the outer periphery of the spool even when the fisherman carelessly drops the fishing rod.

In addition, the protective member reinforces the bail supporting arms. Hence, in winding or dragging out the fishing line, the protective member prevents the bail supporting arms from deformation, which eliminates the difficulty that the bail supporting arms are deformed to abut against the spool and cause the fishing line to pulsate.

The fishing spinning reel as shown in FIG. 13 suffers from the problem that, when the bail is set at the fishing line winding position to wind the fishing line, the rotor is unbalanced in weight, which makes it difficult to smoothly take up the fishing line. On the other hand, in the fishing spinning reel of the invention, the protective member is provided on the side of the fishing line releasing position, so that it corrects the shift in weight of the rotor toward the fishing line winding position.

DETAILED DESCRIPTION OF THE PREFERRED EMBODIMENTS

Preferred embodiments of this invention will be described with reference to the accompanying drawings in detail.

FIGS. 1 through 5 shows an example of a fishing spinning reel, which constitutes a first embodiment of the invention.

Figure 1:
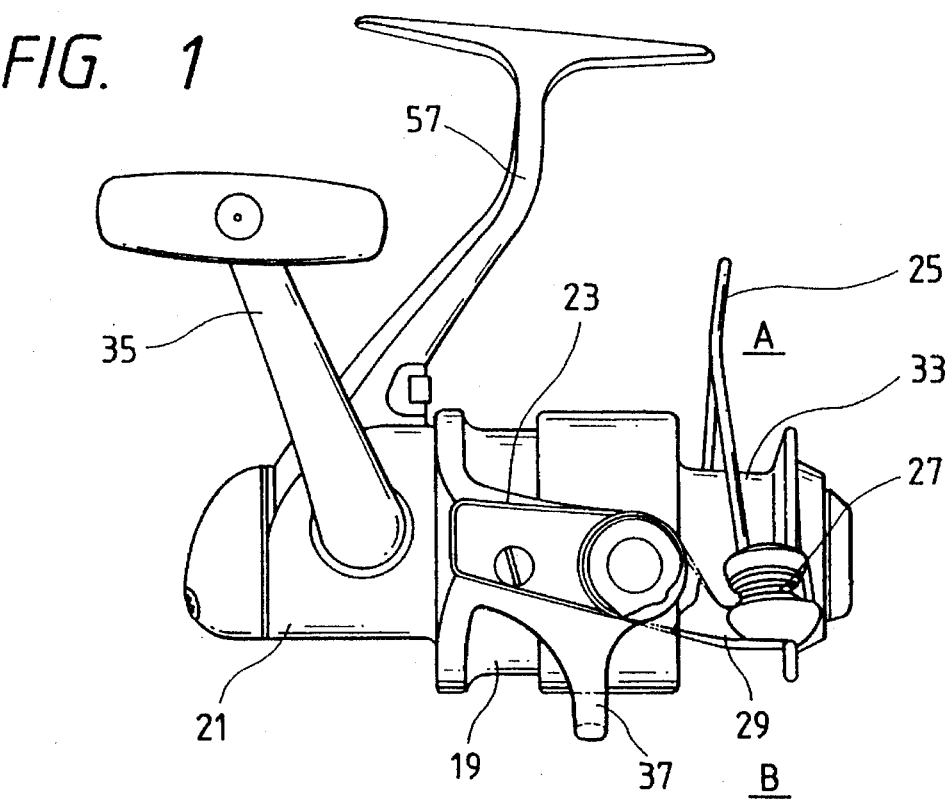
FIG. 1 is a front view of an example of a fishing spinning reel, which constitutes a first embodiment of this invention.
Figure 2:
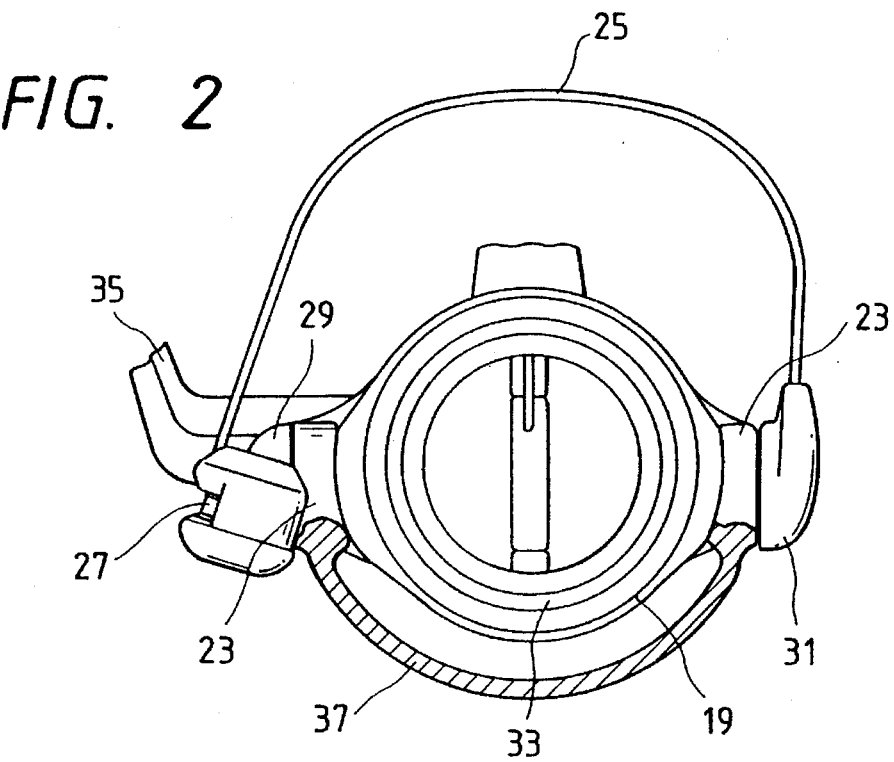
FIG. 2 is a right side view of the fishing spinning reel shown in FIG. 1.
Figure 3:
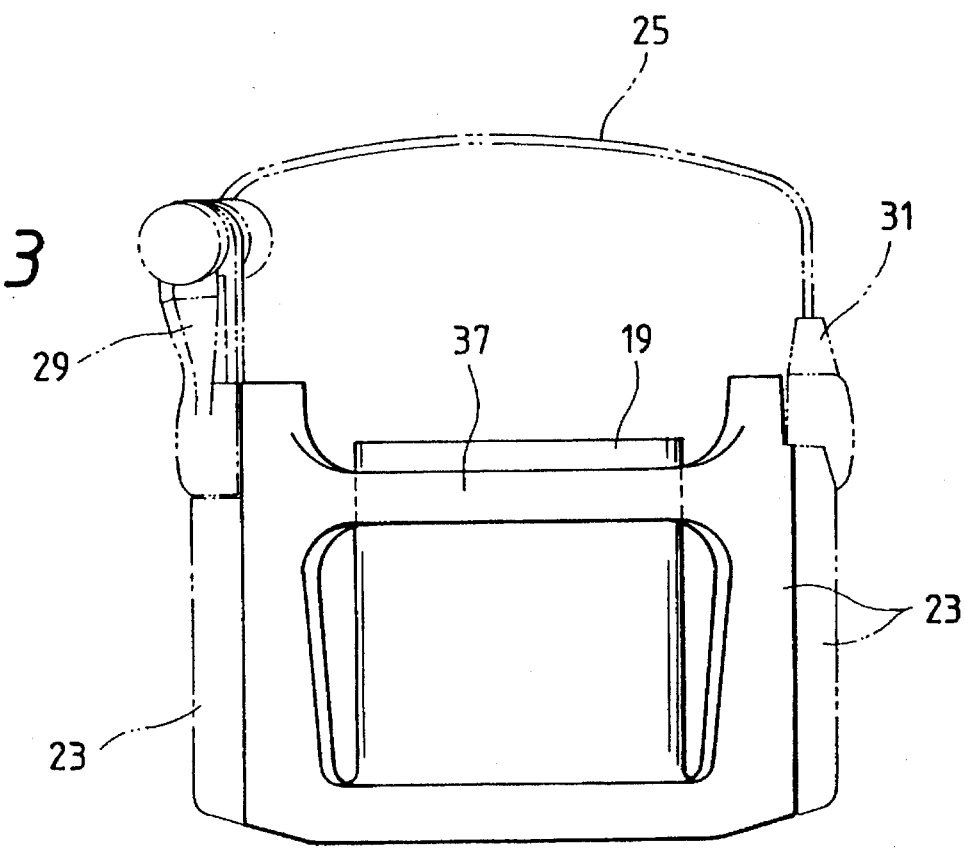
FIG. 3 is a bottom view, on the side of the fishing line releasing position, of the rotor of the fishing spinning reel shown in FIG. 1.
Figure 4:
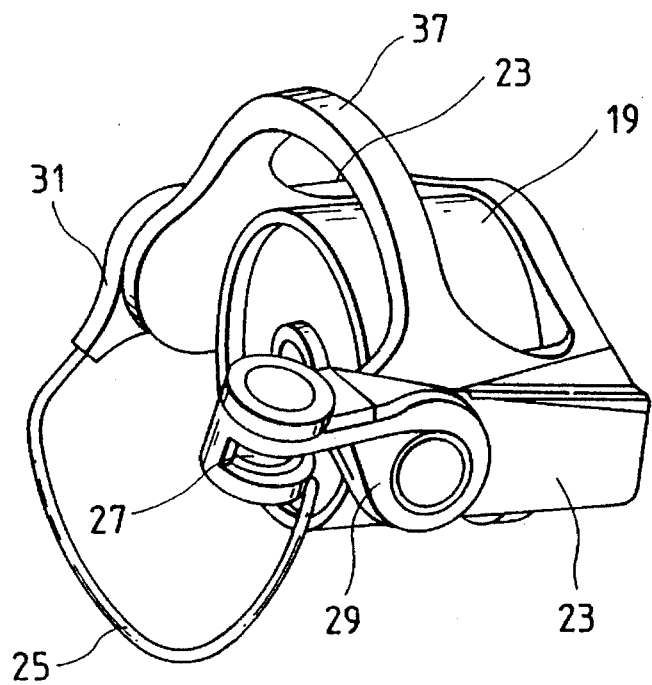
FIG. 4 is a perspective view of the rotor of the first embodiment.

In FIG. 1, reference numeral 19 designates a rotor which is rotatably mounted on the front end portion of a reel body 21. A pair of bail supporting arms 23 are formed on both sides of the rear end portion of the rotor 19 in such a manner that they are integral with the latter 19. A half-ring-shaped bail 25 are coupled to the front ends of the bail supporting arms 23 through bail supporting members, namely, a bail arm 29 with a line roller 27 and a bail holder 31 in (shown in FIG. 2) in such a manner that the bail 25 may be swung to set at the fishing line winding position A and the fishing line releasing position B.

Figure 13:
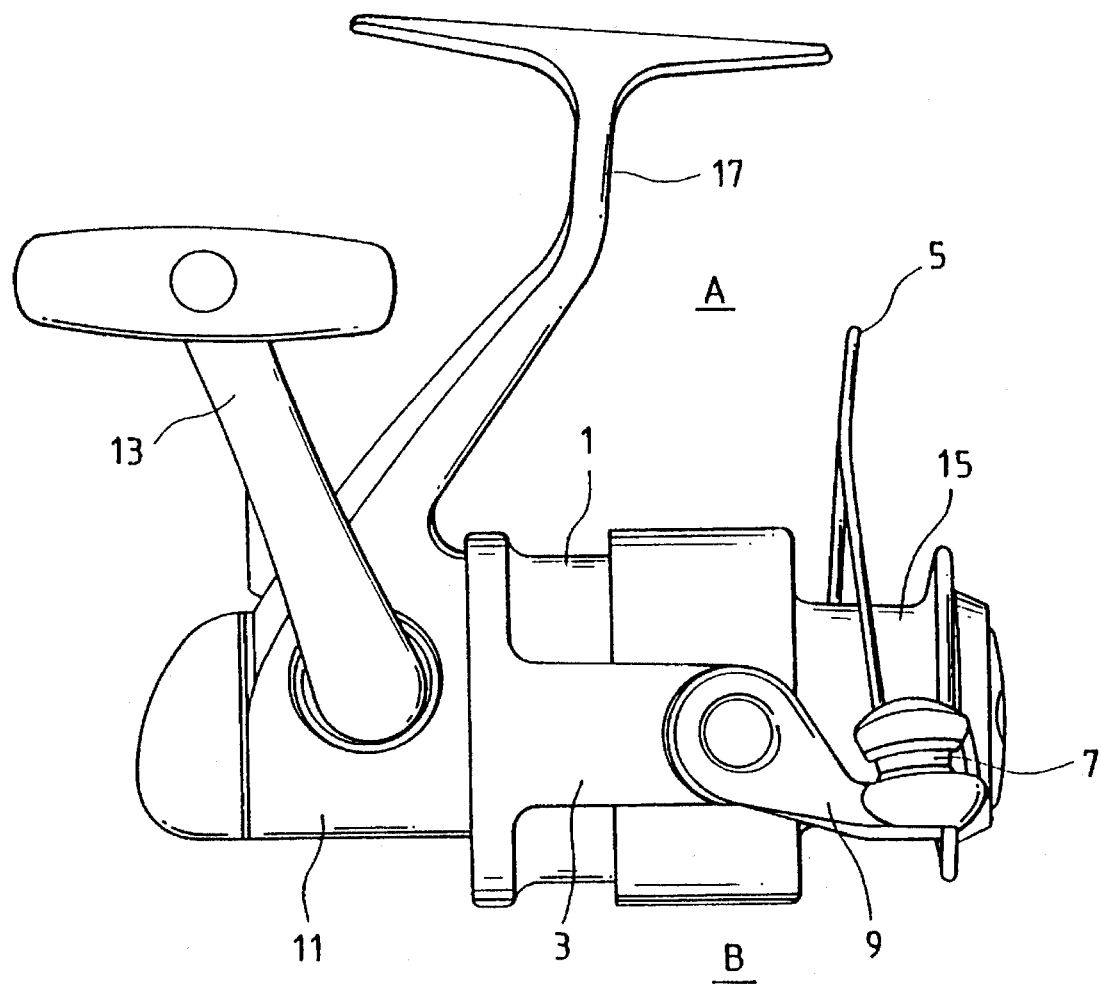
FIG. 13 is a front view of a typical fishing spinning reel.

In FIG. 1, reference numeral 33 designates a spool which is mounted coaxially with the rotor 19. More specifically, the spool 33 is mounted on a spool shaft (not shown) which is provided in the reel body 21 in such a manner that it moves making traverse motion. Similarly as in the case of the fishing spinning reel shown in FIG. 13, when, with the bail 25 set at the fishing line winding position A, the rotor 19 is turned to take up the fishing line by turning a hand-operated handle 35 coupled to the reel body 21, the fishing line is wound on the spool 33 which makes a traverse motion with the rotation of the rotor 19.

As shown in FIGS. 1 through 4, in order to protect the outer periphery of the spool 33, a belt-shaped protective member 37 is provided like an arcuate bridge between the front end portions of the pair of bail supporting arms 23 with a predetermine gap between the protective member 37 and the outer periphery of the rotor 19. Hence, for instance when the fishing rod is carelessly dropped, the protective member 37 prevents the outer periphery of the spool 33 from damage on the side of the fishing line releasing position.

Figure 5:
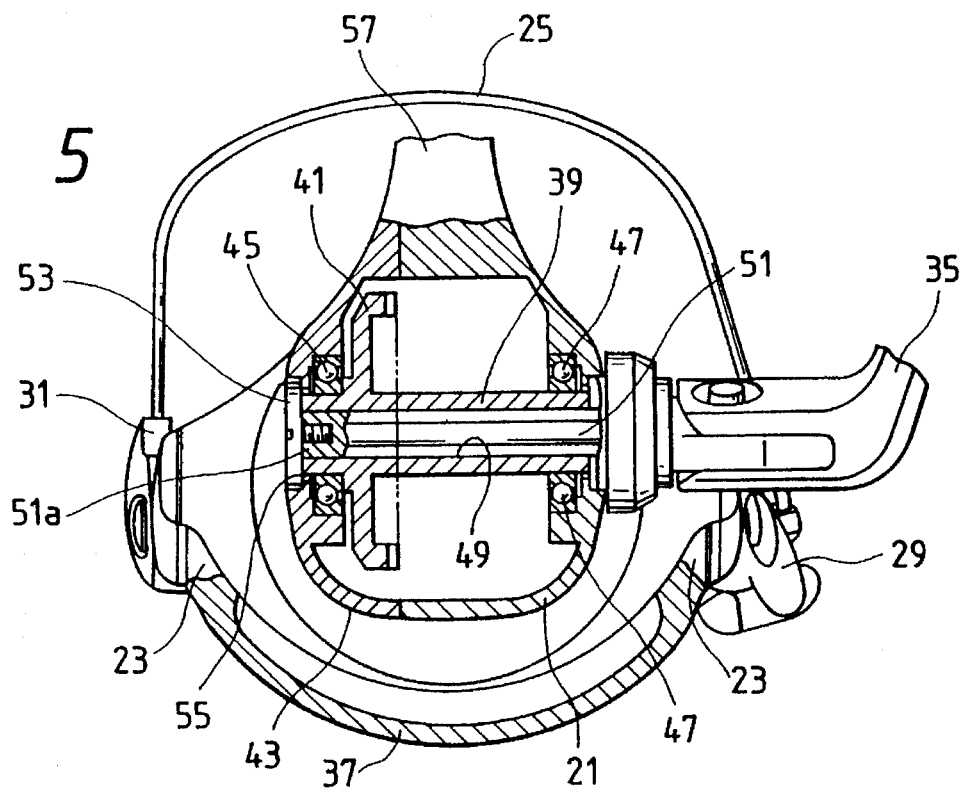
FIG. 5 is a sectional view of the reel body of the first embodiment, showing a mounting structure for a shaft of a manually-operated handle.

FIG. 5 shows a manually-operated handle mounting structure in the first embodiment. In general, the manually-operated handle of a spinning reel is so designed that it is detachably engaged with the reel body, and it may be a clockwise winding handle or a counterclockwise winding handle. In the conventional spinning reel, a cover member covering the supported front end portion of the handle is protruded from the outer periphery of the reel body. Hence, the fishing line is liable to twine around the cover member. In addition, if foreign matters or dirt sticks to the cover member, then it is rather difficult to remove them.

In order to eliminate the above-described difficulty, the fishing spinning reel of the invention has a handle mounting structure designed as follows:

In FIG. 5, reference numeral 39 designates the drive shaft of a drive gear 41; and 43, a cover member mounted on the reel body 21. The cover member 43 has a smooth outer surface. The drive shaft 39 is rotatably supported by bearings 45 and 47 which are coaxially provided between the cover member 43 and the reel body 21. A mounting recess 55 is formed in the cover member 43 so that a screw 53 is set in the mounting recess 55 thus formed. The screw 53 thus set is threadably engaged with the inserting end portion 51a of the handle shaft 51 which is engaged with a rectangular shaft hole 49 formed in the drive shaft 39 in such a manner that the rotation of the handle shaft 51 around the axis of the latter 39 is inhibited. Thus, the manually-operated handle 35 has been mounted on the reel body 21. When the screw 53 is threadably engaged with the inserting end portion 51a of the handle shaft 51, the screw 53 is set in the mounting recess 55 in such a manner that the top of the head of the screw 53 merges with the surface of the cover member 43.

Further in FIG. 1, reference numeral 57 designates a mounting leg extended from the reel body 21.

Since the first embodiment is constructed as described above, even when the fisher carelessly drops the fishing rod while winding the fishing line, the outer periphery of the spool 3 on the side of the fishing line winding position is protected from damage by the fishing rod and the mounting leg 57, while the outer periphery of the spool on the side of the fishing line releasing position is protected by the protective member 37. Hence, when the fisherman carelessly drops the fishing rod, the spool 33 is never brought into contact with the ground; that is, it is positively protected from being damaged or deformed. Thus, the spinning reel of the invention is free from the difficulty that the spool is damaged whereby the fishing line is damaged.

Since the protective member 37 protects the bail supporting arms 23, the latter 23 are prevented from being deformed when the fishing line is wound or dragged out.

In a conventional spinning reel of this type, the bail and the bail supporting members are not symmetrical, and they are protruded in front of the rotor. Hence, when the bail is set at the fishing line winding position to wind the fishing line, the rotor becomes unbalanced in weight, which makes it difficult to smoothly wind the fishing line.

On the other hand, in the embodiment of the invention, as was described above, the protective member 37 is provided on the side of the fishing line releasing side, and the protective member 37 thus provided acts to correct the shift in weight of the rotor 19 when the fishing line is wound with the bail set at the fishing line winding position.

In addition, as was described above, when the fishing line is wound or dragged out, the protective member 37 protects the bail supporting arms 23 from deformation, which eliminates the difficulty that the bail supporting arms are deformed to catch the spool and cause the fishing line to pulsate. Furthermore, in the spinning reel of the invention, the protective member 37 corrects the shift in weight of the rotor 19, so that the fishing line can be smoothly wound or released.

Moreover, the embodiment of the invention is advantageous in that, by reducing the thickness of the protective member 37 or modifying it into a belt-shaped one, the fishing needle can be fastened to the protective member when the fisherman moves to another fishing spot with the fishing rod.

Furthermore, in the embodiment, the surface of the head of the screw 53, which couples the manually-operated handle 35 to the reel body 21, merges with or is flush with the surface of the cover member 43. Hence, the fishing spinning reel of the invention, unlike the conventional one, is advantageous in that it is free from the difficulty that the fishing line twines around the cover member 43. In addition, in the spinning reel of the invention, foreign matters or dirt can be readily wiped off the cover member 43.

Figure 6:
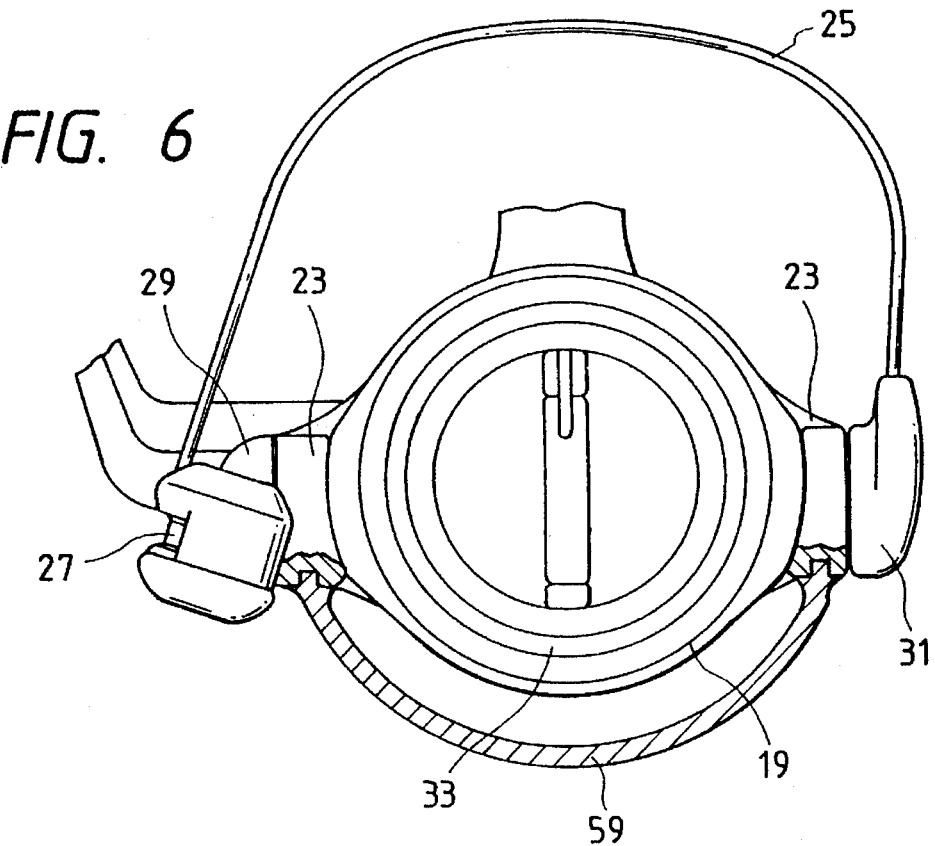
FIG. 6 is a right side view, with parts cut away, showing her example of the fishing spinning reel, which constituting a second embodiment of the invention.
Figure 7:
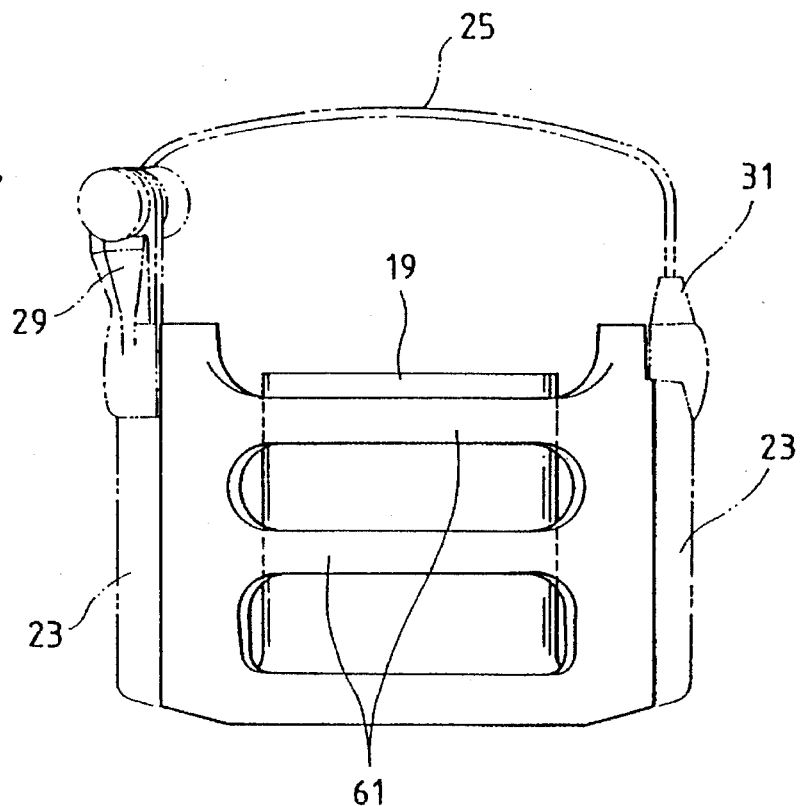
FIG. 7 is a bottom view, on the side of the fishing line releasing position, of the rotor of another example of the fishing spinning reel, which constitutes a third embodiment of the invention.
Figure 8:
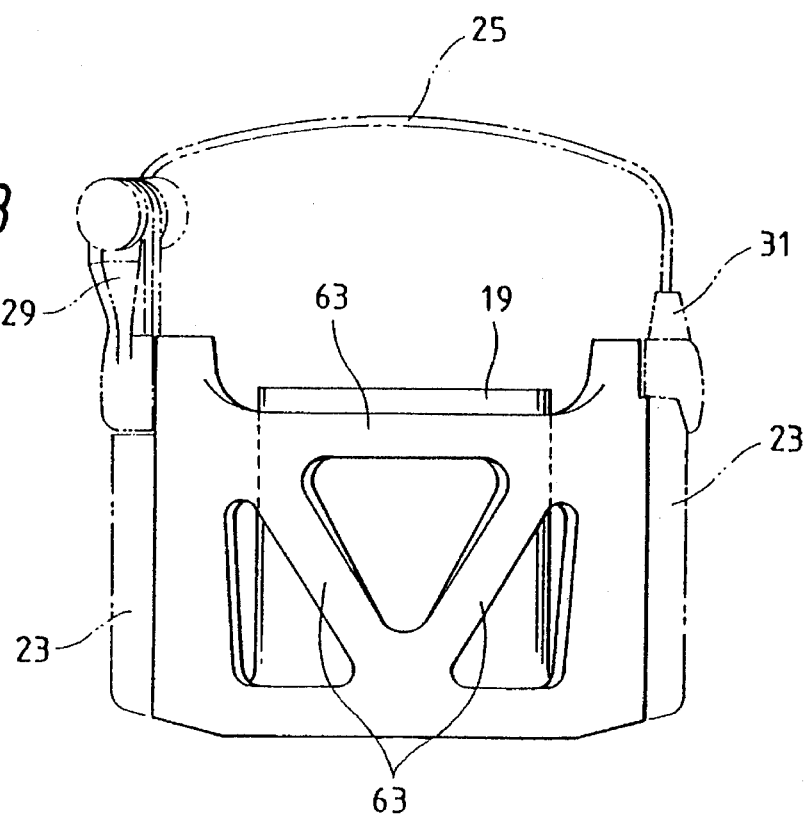
FIG. 8 is a bottom view, on the side of the fishing line releasing position, of the rotor of another example of the fishing spinning reel which constitutes a fourth embodiment of the invention.

FIG. 6 shows a second embodiment of the invention. In the above-described first embodiment, the protective member 37 is integral with the bail supporting arms 23. In the second embodiment, a protective member 59 similar in configuration to the protective member 37 of the first embodiment is formed separately. The protective member 59 is connected to the bail supporting arms 23 by bonding, welding or press-fitting or with screws. It goes without saying that the second embodiment thus constructed has the same effects as the first embodiment, thus achieving the given object of the invention.

FIGS. 7 through 10 are third through sixth embodiments of the invention, respectively, in which the protective member provided, as an arcuate bridge, between the bail supporting arms is modified. In the third embodiment shown in FIG. 7, two protective members 61 similar in configuration to the above-described protective member 35 are connected between the bail supporting members 23 on the side of the fishing line releasing position with a predetermined gap between the outer periphery of the rotor 19 and the protective members 61 in such a manner that those members 61 are in parallel with each other. In the fourth embodiment shown in FIG. 8, three belt-shaped protective members 63 which are small in width are provided between the bail supporting arms 23 with a predetermined gap between the periphery of the rotor 29 and the protective members 63 in such a manner that those members 63 form a triangle.

Figure 9:
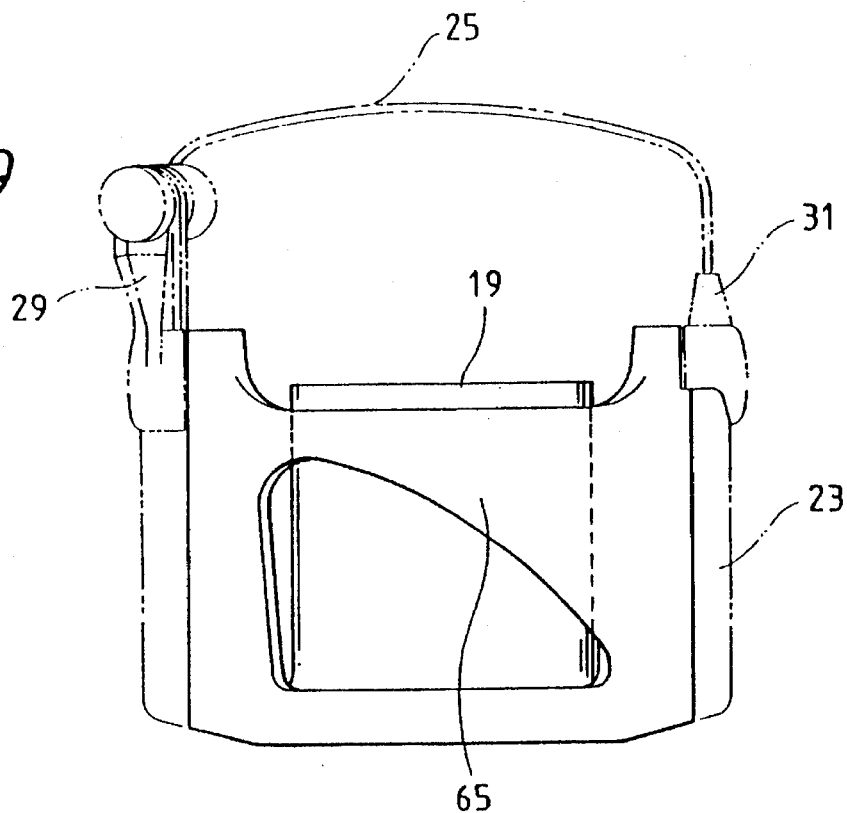
FIG. 9 is a bottom view, on the side of the fishing line releasing position, of the rotor of another example of the fishing spinning reel, which constitutes a fifth embodiment of the invention.

In the fifth embodiment shown in FIG. 9, a protective member provided between the bail supporting arms 23 is larger in width towards one of the bail supporting members 23.

Figure 10:
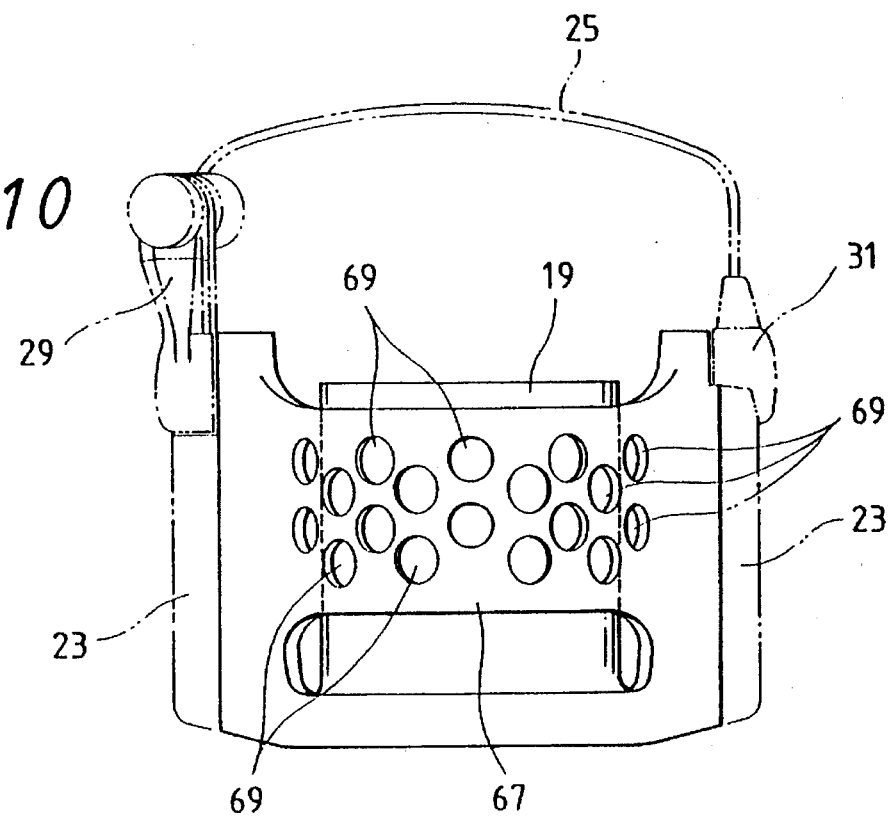
FIG. 10 is a bottom view, on the side of the fishing line releasing position, of the rotor of another example of the fishing spinning reel, which constitutes a sixth embodiment of the invention.

In the sixth embodiment shown in FIG. 10, a protective member 67, which is larger in width than the above-described protective member 37, is connected between the bail supporting arms 23 with a predetermined gap between the outer periphery of the rotor 19 and the protective members 67. It should be noted that a plurality of small holes 69 are formed in the protective member 67 with the balance in weight of the rotor 19 taken into account.

In the above-described third to sixth embodiments, the protective members 61, 63, 65 and 67 protect the outer periphery of the spool 33 on the side of the fishing line releasing position, and prevent the bail supporting arms 23 from deformation when the fishing line is wound or dragged out, and correct the shift in weight of the rotor 19 when the fishing line is wound with the bail set at the fishing line winding position. That is, those embodiments have the same effects as the first embodiments, thus achieving the object of the invention.

Figure 11:
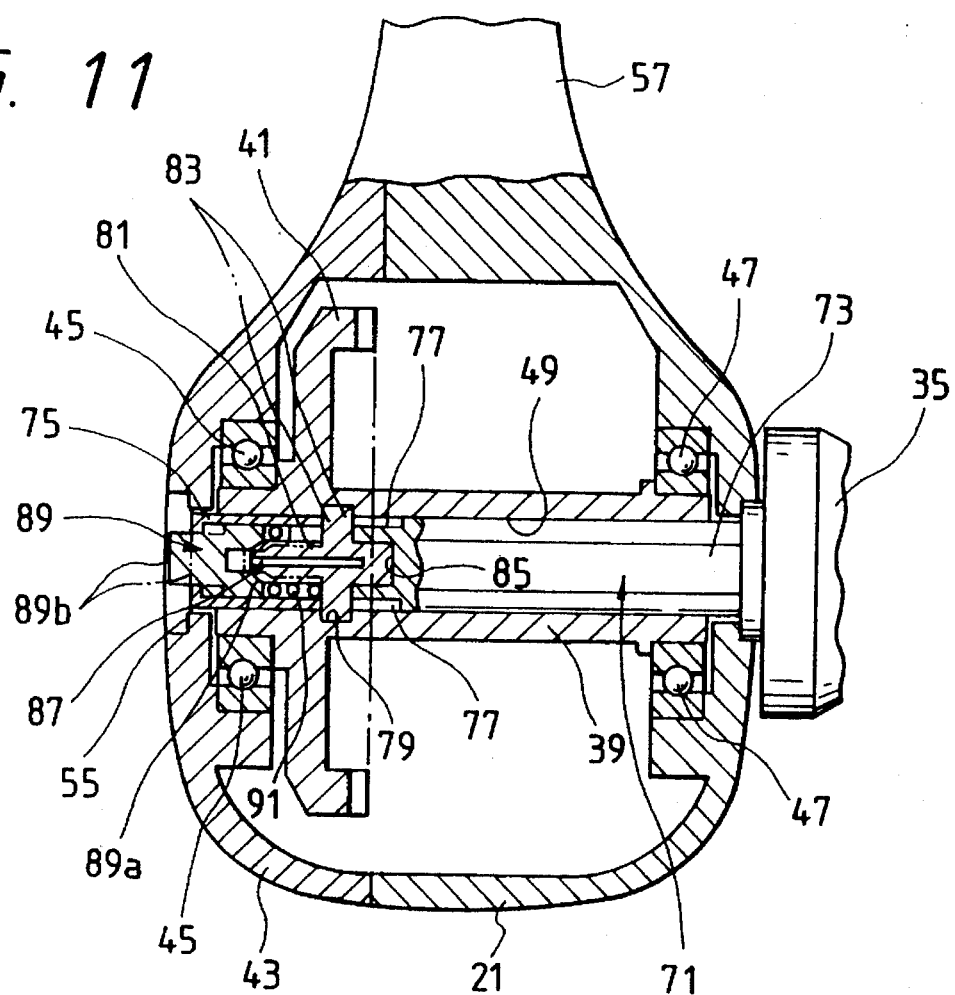
FIG. 11 is a sectional view of the reel body of another example of the fishing spinning reel, showing one modification of the mounting structure for the shaft of the manually-operated handle.

FIG. 11 shows one modification of the manually-operated handle mounting structure in the fishing spinning reel of the invention. In the modification, the shaft of the manually-operated handle is detachably mounted by means of a push button.

The modification will be described with reference to FIG. 11 in detail, in which parts corresponding functionally to those which have been described with reference to the handle mounting structure shown in FIG. 5 are therefore designated by the same reference numerals or characters.

In FIG. 11, reference numeral 71 designates the shaft of the manually-operated handle 35 which is engaged with the rectangular shaft hole 49 formed in the drive shaft 39 in such a manner that its rotation around the axis of the drive shaft is inhibited. The handle shaft 71 comprises a base portion, namely, a solid shaft body 73, and a hollow cylinder 75 threadably engaged with the end of the shaft body 73. A pair of slits 77 are formed in the threaded portion of the hollow cylinder 75 at angular intervals of 180° in such a manner that they are extended axially of the shaft. When the hollow cylinder 75 is threadably engaged with the solid shaft body 73, a pair of stopper pieces 83 of a stopper member 81 (described later) which are detachably engaged with recess-like locking portions 79 (hereinafter referred to as "locking recesses 79", when applicable) formed in the inner surface of the angular shaft hole 49, are allowed to extend outwardly through the slits 77 as shown in FIG. 12.

The stopper member 81 is in the form of a cylinder having a tapered front end portion. The stopper member 81 is accommodated in the hollow cylinder 75 in such a manner that its rear end is engaged with a recess 85 formed in the front end face of the shaft body 73. And the stopper member 81 has the aforementioned stopper pieces 83 on its outer surface which are extended radially outwardly, and has a slit 87 which is extended axially from the front end.

In FIG. 11, reference numeral 89 designates a push button. The push button 89 is extended through the hollow cylinder 75 into the mounting recess 55 formed in the cover member 43, and it has a tapered portion 89a at the rear end which is abutted against the tapered front end portion of the stopper member 81. A spring 91 is interposed between the push button 89 and the stopper pieces 83, so that, when the stopper pieces 83 are engaged with the locking recesses 79, the push button 89 is urged outwardly by the spring 91, as a result of which its head 89b is set flush with the surface of the cover member 43. When the push button 89 is depressed against the elastic force of the spring 91, the tapered portion 89a of the push button 89 squeezes the slitted front end portion of the stopper member 81 inwardly, so that the stopper pieces 83 are disengaged from the locking recesses 79. Hence, under this condition, pulling the handle shaft 71 out of the rectangular shaft hole 49 removes the handle 35 from the reel body 21.

Figure 12:
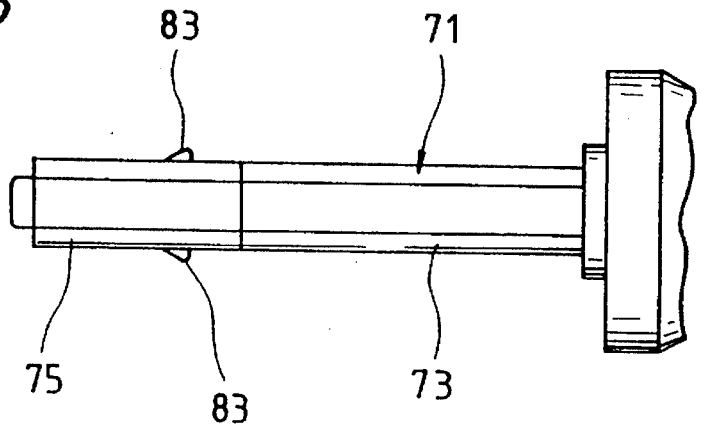
FIG. 12 is a front view of the shaft of the manually-operated handle shown in FIG. 11.

As shown in FIG. 12, the front end portion of each of the stopper pieces 83 is sloped towards the front end of the handle shaft 71. Hence, as the handle shaft 71 is inserted into the rectangular shaft hole 49, the stopper pieces 83 are moved inwardly being pushed by the inner surface of the rectangular shaft hole 49, and when the stopper pieces 83 reach the locking recesses 79, the stopper member 81 is sprung back so that the stopper pieces 83 are engaged with the locking recesses 79; that is, the handle 35 is coupled to the reel body 21.

The front end portion of the hollow cylinder 75 is bent inwardly so as to prevent the push button 89 from coming off the hollow cylinder 75, because the push button is kept urged by the spring 91.

The handle mounting structure thus constructed has the following effects or merits: The handle 35 can be readily removed from the reel body by one action of depressing the push button 89. Similarly as in the handle mounting structure shown in FIG. 5, the handle mounting structure shown in FIG. 11 is advantageous in that it is free from the difficulty that the fishing line twines around the cover member 43, and foreign matters or dirt can be readily removed form the cover member 43.

As was described above, when the fisherman carelessly drops the fishing rod, the spool is protected by the protective member. That is, the difficulties accompanying the conventional spinning reel have been eliminated that, when the fishing rod is dropped, the spool is damaged or deformed, and accordingly the fishing line is also damaged.

When the fishing line is wound or dragged out, the protective member prevents the deformation of the bail supporting arms, which eliminates the difficulty that the bail supporting arms are deformed to catch the spool and cause the fishing line to pulsate. Furthermore, the protective member 37 corrects the shift in weight of the rotor 19, so that fishing line can be smoothly wound or let out.

Moreover, with the spinning reel whose protective member is modified in configuration according to the invention, the fishing needle can be fastened to the protective member when the fisherman moves to another fishing spot with the fishing rod.

What is claimed is:

1. A rotor for a fishing reel in which a fishline is wound onto a spool, said spool and rotor having a common axis; said rotor comprising:

a base frame having a periphery;

a pair of upstanding support arms each positioned near said periphery of said base frame and extending therefrom in a direction substantially parallel to said common axis terminating at an end, said pair of upstanding members defining a fishing line winding side and a fishing line releasing side one on either side of a plane, said plane being substantially parallel to said common axis and intersecting said upstanding support arms;

a bail pivotably mounted to each of said ends so that said bail is swingable from either one of said sides to the other;

a first protective member disposed between said pair of upstanding support arms along an arc on said fishing line releasing side, said protective member being entirely positioned between said base frame and said ends of said upstanding supporting arms.

2. A rotor as recited in claim 1, further comprising:

a second protective member disposed between said pair of upstanding support arms along said periphery parallel to and spaced apart from said first protective member.

3. A rotor as recited in claim 1, wherein said first protective member has a varied width measured in a direction parallel to said common axis, said varied width progressing from a small width to a large width from one upstanding support arm to the other.

4. A rotor as recited in claim 1, wherein said first protective member comprises:

a plurality of bores extending therethrough in a radial direction from said common axis.

5. A rotor as recited in claim 1, further comprising:

second and third protective members extending from said periphery of said frame from a central point between said upstanding support arms on said fishing line releasing side towards said first protective member, said second and said third protective members diverging from one another as they extend towards said first protective member.

6. A rotor as recited in claim 1, wherein said first protective member has a thickness measured in a radial direction extending from said common axis and a width measured in a direction parallel to said common axis, said width being substantially greater than said thickness.

7. A rotor as recited in claim 1, wherein said protective member is formed of a rigid material to strengthen the structural stability of said upstanding support members.

8. A rotor as recited in claim 1, wherein said base frame, said upstanding support arms and said protective member are integrally formed as a unitary body.

9. A rotor as recited in claim 1, wherein said rotor further comprises:

a cylindrical portion extending from said base frame coaxially with said common axis, said cylindrical portion terminating at an end and having an outer cylindrical surface circumscribing said common axis, said end of said cylindrical member positioned along said common axis at a point no further than said ends of said upstanding support arms, wherein:

said first protective member is disposed along an arc radially offset from said outer cylindrical surface to define a gap therebetween.

* * * * *